(12) United States Patent
Hall et al.

(10) Patent No.: US 6,287,179 B1
(45) Date of Patent: Sep. 11, 2001

(54) SUPERABRASIVE INDEXABLE CUTTING TOOL

(76) Inventors: David R. Hall; Joe Fox, both of 2185 S. Larsen Pkwy., Provo, UT (US) 84606

( * ) Notice: Subject to any disclaimer, the term of this patent is extended or adjusted under 35 U.S.C. 154(b) by 0 days.

(21) Appl. No.: 09/527,587

(22) Filed: Mar. 17, 2000

(51) Int. Cl.[7] .................................................. B24C 3/00
(52) U.S. Cl. ................... 451/75; 451/47; 451/48
(58) Field of Search ................... 451/75, 47, 48

(56) References Cited

U.S. PATENT DOCUMENTS 4,667,755 * 5/1987 Muller et al. .
4,798,026 * 1/1989 Cerceau .
5,205,684 * 4/1993 Meskin et al. .

* cited by examiner

Primary Examiner—Timothy V. Eley
Assistant Examiner—Willie Berry, Jr.

(57) ABSTRACT

An indexable tool for machining abrasion resistant materials comprising a one or more cutting elements of superabrasive material selected from the group consisting of polycrystalline diamond or cubic boron nitride produced by the high-pressure high-temperature sintering method integrally bonded into a cemented metal carbide substrate. Each cutting element is defined by a non-planar bottom surface that slopes radially downward and by sidewalls that slant outward from their junction with said bottom surface. The cutting element further comprises a nose portion comprising a cutting land that also may exhibit a positive or negative rake angle and a chipbreaker.

20 Claims, 3 Drawing Sheets

SUPERABRASIVE INDEXABLE CUTTING TOOL

RELATED APPLICATIONS

None

BACKGROUND OF THE INVENTION

This invention relates to a superabrasive indexable cutting tool for machining abrasion resistant materials. More particularly, this invention relates to such a tool having one or more cutting elements comprising a superabrasive material, such as polycrystalline diamond or cubic boron nitride, that are integrally bonded to a tool body during the high-pressure high-temperature sintering process. The cutting elements are defined by a preformed pocket in the tool body having a radially sloping, non-planar bottom surface and by sidewalls that slant outward from their junction with the bottom surface.

Machining of abrasion resistant materials requires the use of a variety of cutting tools using differing shapes and materials. There are actually hundreds of combinations in use depending on specific machining applications. Such factors as spindle and workpiece feed rates, workpiece hardness and chemical properties, degree of finish desired, and the equipment being used must be considered in modern machining operations. During the cutting operation, these tools are held in place against the workpiece in a tool holder, chuck, collet, or other such fixture capable of clamping the cutting element in place. Generally, tight production deadlines, tighter tolerances, modern machining technology, and the ever increasing variety of workpiece materials combine to place greater demands than ever before on the capability of the machine cutting tools.

High-pressure high-temperature superabrasive cutting tools have become a popular solution for many machine tool applications. However, the special properties of superabrasives present many challenges in the machine tool cutting environment due to their unique nature. First of all, cutting tools using superabrasive materials are more expensive to produce than many other cutting tools. This increased expense in the fabrication of a superabrasive tool is largely due to the inert nature of superabrasives, themselves, which makes them difficult to bond to a tool body. Secondly, their life is limited because they are not easily resharpened, or may not be resharpened as often as other tools. Thirdly, though superabrasives are the hardest and most wear resistant of any materials used for cutting, they lack the toughness of many less hard materials, and are less tolerant of tensile stress induced by the cutting forces as the workpiece is fed into the cutting operation. Finally, superabrasives are high heat sensitive. The metal binder used in polycrystalline diamond, for example, degrades at around 700° C., and cubic boron nitride has a temperature limit of around 1200 °C. Once these limits are exceeded, the cutting elements degrade, crack, and spall resulting in cutting tool wear and failure.

Therefore, it is desirable to provide a cutting tool using superabrasive cutting elements that is economical to produce, has greater toughness and greater resistance to cutting forces, less sensitivity to the heat produced in modern machine tool cutting operations, and is capable of being resharpened thereby having extended tool life.

SUMMARY OF THE INVENTION

This invention presents an economical indexable tool for machining abrasion resistant materials having high wear resistance and toughness, improved resistance to cutting forces, improved heat tolerance though heat spreading capability, and life. The tool body is comprised of a cemented metal carbide substrate having one or more superabrasive cutting elements that are bonded into the substrate during the high-pressure high-temperature sintering process. The superabrasive material is selected from the group consisting of polycrystalline diamond or cubic boron nitride. Each cutting element is defined by a preformed pocket in the tool body having a radially, downward-sloping, non-planar bottom surface comprising a plurality of protrusions and depressions, sidewalls that slant outward from their junction with the bottom surface, and a nose portion comprising a cutting land. The nose portion and the cutting land may also consist of positive or negative rake angles and a chipbreaker. The cutting elements may be equally spaced apart at 90°, 120°, or 180° on one or both major surfaces of the tool.

DETAILED DESCRIPTION OF THE INVENTION

Figure 2:
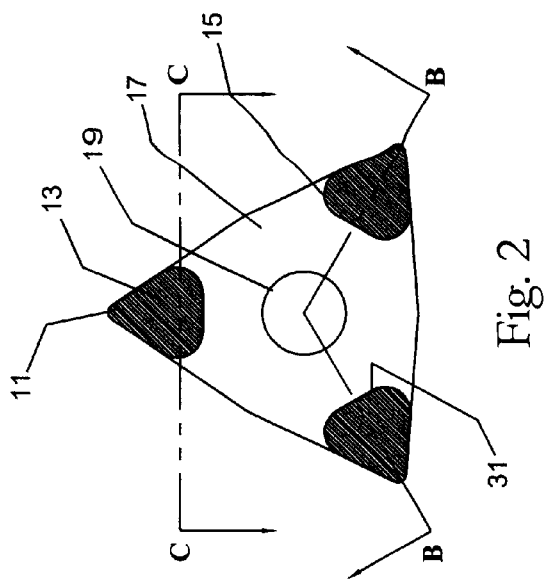
FIG. 2 is a plan view of a cutting tool of the present invention having superabrasive cutting elements displayed at 120° on one or both major surfaces.

This invention presents an economical superabrasive indexable tool for machining abrasion resistant materials having improved wear resistance and toughness, improved resistance to machine cutting forces, improved heat spreading capability, and life.

The superabrasive material of this invention is selected from the group consisting of polycrystalline diamond or cubic boron nitride by the high-pressure high-temperature sintering method.

In the half-century since the discovery of the conditions within which superabrasives are formed, polycrystalline diamond and cubic boron nitride have become commonplace in many manufacturing environments. One of the most prolific uses of superabrasives is in the machining industry. Tools manufactured with cutting elements of a superabrasive material have greatly increased the efficiency and productivity of manufacturing operations. In fact, if it were not for these highly wear resistance materials, tools to manufacture such items as lightweight vehicle engines and components would be extremely expensive and not readily available.

Commercial superabrasives are typically manufactured by the high-pressure high-temperature sinteting methods.

These methods vary somewhat but are well know in the art. Generally, they consist of placing a quantity of superabrasive crystals on a cemented metal carbide substrate and sealing them inside a refractory metal container. The cemented carbide substrate not only provides a platform for the superabrasive, but it also imparts toughness to the final product, since the carbide has higher tensile strength than the superabrasive. The container is then loaded into an insulating reaction vessel, and the reaction vessel is inserted into the reaction zone of a high-pressure high-temperature press apparatus. The press is then activated and the reaction vessel is subjected to pressures and temperatures in the region where the superabrasive material is crystallographically stable. This region is usually above 3.5 Gpa and 1150°C. The superabrasive is allowed to remain under these conditions for a sufficient period of time for sintering to occur. Then, the reaction vessel is returned to ambient temperature and pressure conditions. In this process, the superabrasive becomes a monolithic mass, integrally bonded to the substrate, and may actually take on a morphology defined by the geometry of the substrate. This provides an economical means for producing a cutting tool since the tool can manufactured in a single operation without the need of subsequent brazing operations.

In the present invention, one or more triangularly shaped pockets are preformed into the substrate on one or both of the substrate's major surfaces, providing a receptacle for the superabrasive crystals. As sinteting occurs and the superabrasive crystals become a consolidated, a monolithic mass is formed that is integrally bonded to the substrate along the bottom and sides of the pocket. The unitary mass of superabrasive then becomes the cutting element of the tool, while the substrate acts as the tool body. A through hole in the center of the tool body functions as an indexable means for attaching the tool to a tool holder.

The triangular shape of the cutting element is defined by the boundaries of the pocket in the substrate. The cutting element has a triangularly shaped bottom that slopes radially downward with the point intersecting the perimeter of the substrate. The bottom features a non-planar surface topography consisting of a plurality of protrusions and depressions. The sidewalls of the cutting element have rounded corners and edges, where they intersect with the bottom surface, and are slanted outward from the bottom. They also terminate at the periphery of the tool, but back from the point or nose of the cutting element. The triangular shape, sloping bottom surface, and slanted sidewalls of the pocket produce a cutting element having a large volume of superabrasive material that is better capable of withstanding the dynamic conditions of machine tool cutting.

The nose portion of the cutting element is cut and ground by processes known in the art to produce a cutting land as well as positive or negative rake angles according to the application of the tool. A chipbreaker may also be provided along the top surface of the cutting element. The chipbreaker may be preformed into the top surface of the cutting element during the sintering process or it may be mechanically formed afterwards.

The cutting elements may be equally spaced apart at 90°, 120°, or 180° on either one or both major surfaces of the tool. Alternatively, the cutting element of the present invention may be used in combination with a cutting element formed of the carbide substrate, itself.

The improvements of the present invention will be further described in connection with a detailed description of the drawings. Identical numbers are assigned to like structures in the figures.

Figure 1A:
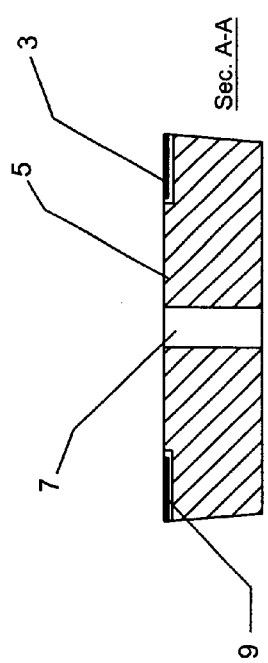
FIG. 1a is a sectioned view of prior art FIG. 1.
Figure 1:
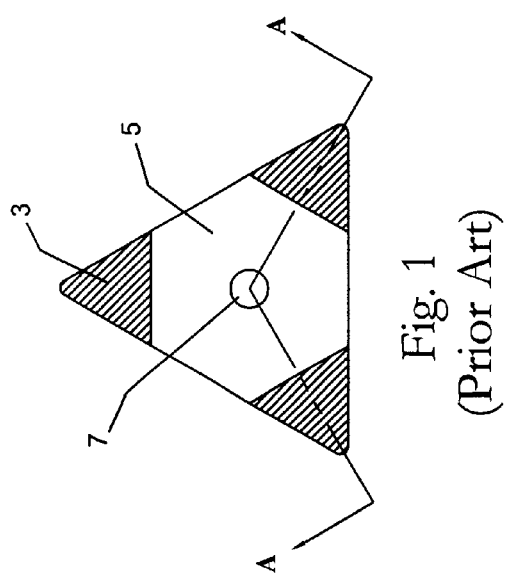
FIG. 1 is a plan view of a prior art indexable cutting tool.

FIG. 1 depicts in plan view a prior art indexable machine tool cutting insert. The tool body 5 is comprised of cemented metal carbide such as tungsten carbide and is fitted with a through hole 7 as a means for attachment to a tool holder. A thin wafer of superabrasive material 3 is disposed at the corners of the tool. Each wafer comprises a cutting land. The superabrasive material is either polycrystalline diamond or cubic boron nitride. The superabrasive cutting element is usually attached to the tool body by brazing.

FIG. 1a is a sectioned view of prior art FIG. 1. This view shows the through hole 7 as a means for attachment to a tool holder, the tool body 5, and the thin wafer of superabrasive 3. In addition, a braze joint 9 is shown.

Attaching the cutting element to the tool body by means of brazing is an expensive process that if not carefully monitored can damage the superabrasive material since it is high heat sensitive.

High quality superabrasives are extremely wear resistant and seldom fail from abrading the workpiece alone. It's the heat and stress induced by high speed machining that are most often the culprits of early cutting element failure. Generally, superabrasives have very low thermal capacity, while they have high thermal conductivity. For this reason, if high temperatures are not quickly dissipated failure is likely. When a cutting element of superabrasive is attached to the tool body by a chemical means such as brazing, a thermal barrier is created between the dissimilar materials at the braze junction. Junction thermal resistance impedes the transfer of the thermal energy between the dissimilar materials and causes temperatures to rise in the cutting element during the tool cutting operation. High temperatures degrade the braze joint and cause the residual metal binder in the superabrasive material to expand resulting in thermal cracking and chipping and premature failure of the cutting tool. Also, thin wafers of superabrasives are easily chipped either by interrupted cuts or mishandling due to their inferior toughness compared to other machine tool materials. It is desirable, therefore, to provide a cutting element that has a higher volume of superabrasive material, and thereby more robust, and one having a low impedance thermal junction with the tool body in order to quickly dissipate the heat produced during the cutting operation.

FIG. 2 is a plan view of an indexable cutting tool of the present invention having superabrasive cutting elements 13 displayed at 120° around the perimeter of the cutting tool body. It has a triangular shaped tool body 17 consisting of a cemented metal carbide, such as tungsten carbide, and an indexable means for attachment 19 to a tool holder. Nose portion 11 comprises a cutting land, and sidewall 31 of the pocket, into which the superabrasive is bonded, has rounded corners 15. Superabrasives have low thermal capacity but high rates of the thermal conductivity, so it is important to provide a means for removing the heat from the cutting element as quickly as possible. The high volume and high surface area of the triangular shape of the cutting element serves as a means for quickly conducting heat away from the nose of the cutting element and conducting it into the tool body, as well as convecting it into the turbulent atmosphere proximate the rapidly rotating work piece.

Figure 2A:
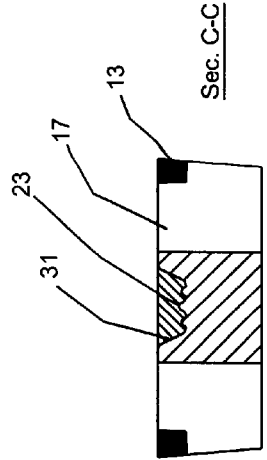
FIG. 2a is a sectioned view of the cutting tool of FIG. 2 depicting cutting elements on one major surface.

FIG. 2a is sectioned view B—B of the indexable cutting tool of FIG. 2 depicting cutting elements 13 integrally bonded into a plurality of preformed pockets on one major surface of the tool body 17. These cutting elements are intimately coupled to the tool body by chemical bonding during the high-pressure high-temperature sintering operation. Intimate coupling produces a low impedance thermal junction between the cutting element and the tool body, promoting the rapid conduction of thermal energy from the low capacity cutting element into the high capacity tool body. The tool body has an even higher volume and broader surface area than the cutting element, itself, aiding convection of the heat into the turbulent atmosphere. A through hole 19 is provided as an indexable means of attachment to a tool holder. A preformed chipbreaker 21 on the surface of the cutting element may also be provided by either molding it into the surface of the cutting element during sintering, or by using machine shop technologies such as grinding or EDM cutting. The radially, downwardly sloping, non-planar bottom surface 23 of the cutting element is depicted having a plurality of protrusions and depressions. The downward slope of the pocket also serves to increase the volume of the superabrasive in the cutting element. The sloping, non-planar surface of the pocket provides a greater surface area for attachment of the superabrasive to the tool body, thereby increasing the bond strength between the cutting element and tool body. Also, it serves to reduce the stresses in the superabrasive that are necessarily induced during the cutting operation.

It is known in the art that a negative-rake cutting tool can be applied more aggressively to the work piece due to the fact that the cutting forces are more normal to the tool body, placing it in compression rather than tension, and due to the fact that they are directed into, and spread across, a larger area of the tool body. However, the negative rake configuration limits the use of the cutting tool in operation. The applicants believe that this same affect may be achieved by means of sloping the bottom surface of the cutting element. As the cutting tool of the present invention is fed into the work piece, the cutting forces are spread across a larger area and directed into the cutting element at an angle that is more likely to result in a compressive stress on the tool body and superabrasive than a tensile stress. Since superabrasives have higher impact resistant and transverse rupture strength in compression than in tension, the configuration of the cutting element of the present invention provides greater resistance to the cutting forces induced in the cutting operation.

During the high-pressure high-temperature sintering process, catalyst metal present in the tool body infiltrates into the superabrasive material causing crystalline intergrowth. The protrusions and depressions along the bottom surface of the preformed pocket in the tool body not only increase the surface area from which the catalyst may infiltrate, they also induce infiltration in three dimensions instead of one, and they shorten the distance of infiltration, achieving a more uniform distribution of catalyst infiltration throughout the entire mass. More uniform infiltration improves crystal-to-crystal intergrowth making the cutting element more resistant to impact and erosion forces, and produces a cutting element having higher thermal conductivity.

The rear sidewall 25, and the other sidewalls of the cutting element that are not shown, are all slanted outward from their junction with the bottom surface. The slanted sidewalls serve to increase the volume of superabrasive in the cutting element, and they facilitate preloading and compacting of the superabrasive into the preformed pocket. As sintering occurs under heat and pressure, the superabrasive material consolidates into the wedged shaped pocket actually placing the superabrasive in compression within the tool body. This pre-loaded condition of the cutting element enables the cutting element to better withstand the tensile stresses placed upon it during the cutting operation. The element is also shown with an optional positive rake angle 29. The cutting tool of this invention overcomes the deficiencies of the prior art tools.

Figure 2B:
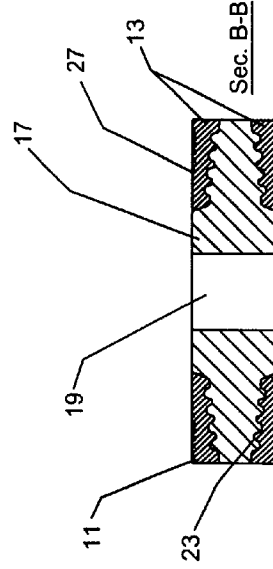
FIG. 2b is a sectioned view of the cutting tool of FIG. 2 depicting cutting elements displayed on two major surfaces of the tool.

FIG. 2b is sectioned view B—B of the indexable cutting tool of FIG. 2, depicting cutting elements 13 on both major surfaces of the tool body 17 having a nose portion 11 having a cutting land. The overall life of the cutting tool is extended by means of increasing the number of cutting elements located on the tool body. Tool life is also extended in all embodiments of the present invention because of the high volume of superabrasive in each cutting element, which permits a greater number of resharpenings. The tool has a through hole 19 that functions as a means for indexable attachment to a tool holder. The cutting elements are defined by a radially sloping, non-planar bottom surface 23 having a plurality of protrusions and depressions. The sidewalls 25 are slanted outward for their junction with the bottom surface.

Figure 2C:
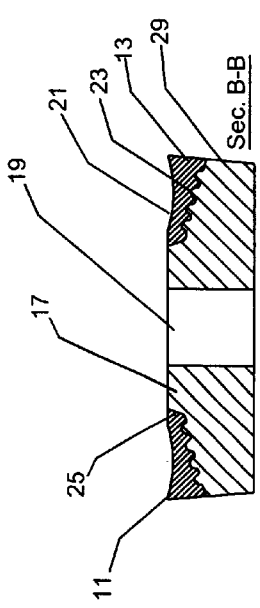
FIG. 2c is a sectioned view of the cutting tool of FIG. 2 depicting the bottom surface and sidewalls of the cutting element.

FIG. 2c is sectioned view C—C of the indexable cutting tool of FIG. 2 depicting the superabrasive 13, the tool body 17, bottom surface 23 having a plurality of protrusions and depressions, and sidewalls 31 of the cutting element that slope outward from their junction with the bottom surface.

Figure 3:
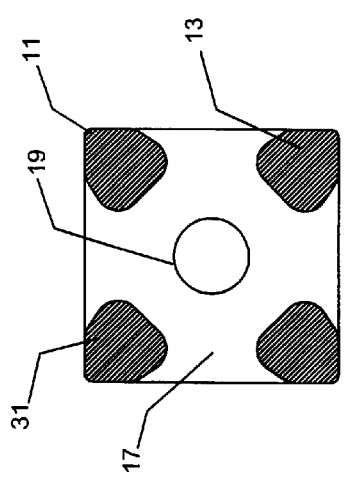
FIG. 3 is a plan view of a cutting tool of the present invention exhibiting cutting elements displayed at 90°.

FIG. 3 is a plan view of an indexable cutting tool of the present invention exhibiting cutting elements 13 displayed at 90°, a square shaped cemented metal carbide tool body 17, a through hole 19, a nose portion 11 comprising a cutting land, and sidewalls 31 having rounded corners.

Figure 4:
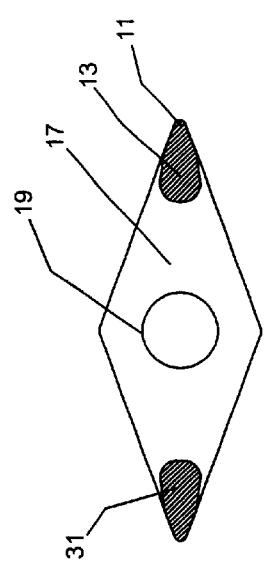
FIG. 4 is a plan view of a cutting tool of the present invention exhibiting cutting elements displayed at 180°.

FIG. 4 is a plan view of an indexable cutting tool of the present invention exhibiting cutting elements 13 displayed at 180°, and diamond shaped tool body 17 consisting of a cemented metal carbide such as tungsten carbide, a through hole 19, and sidewalls 31 having rounded corners.

Figure 5:
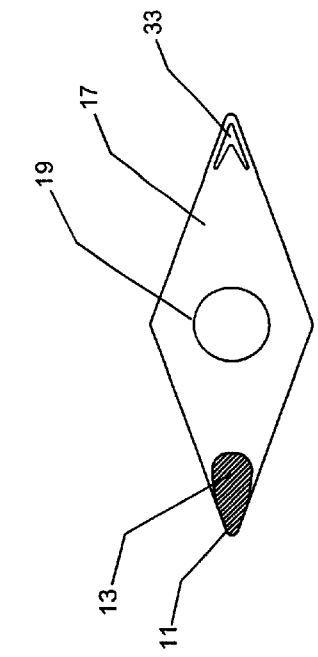
FIG. 5 is a plan view of a cutting tool of this invention exhibiting one superabrasive cutting element and a nose and cutting land preformed into the substrate.

FIG. 5 is a plan view of an indexable cutting tool of this invention exhibiting one superabrasive cutting element 13 having a nose portion 11 consisting of a cutting land, and a nose and cutting land 33 preformed into the substrate on the opposite side of the diamond shaped tool body 17.

Although the invention has been described by reference to specific embodiments, it should be understood that numerous changes may be made within the spirit and scope of the inventive concepts described. Accordingly, it is intended that the invention not be limited to the described embodiments. Those skilled in the art will undoubtedly recognize changes that are not specifically described in this disclosure. These adaptations are incorporated within the bounds of this disclosure.

What is claimed:

1. A superabrasive indexable tool for machining abrasion resistant materials, comprising:
   a. an indexable tool body consisting of a cemented metal carbide substrate comprising two major surfaces joined by a peripheral sidewall, and further comprising a plurality of equally spaced apart preformed pockets intersecting said sidewall, each pocket comprising a non-planar bottom surface having a downward slope of less than 48°, but greater than 2°, in relation to the major surface on which it is located, and sidewalls that slope outward from their junction with said bottom surfase;
   b. a plurality of cutting elements defined by said pockets consisting of a superabrasive material bonded into said pockets during a high-pressure high-temperature sintering process; and
   c. the cutting elements comprising a nose portion with a cutting land, the nose portion forrming a portion of the peripheral sidewall of the tool body.

2. The indexable tool of claim 1, wherein the pockets in the tool body have a generally triangular shape.

3. The indexable tool of claim 1, wherein the superabrasive material is selected from the group consisting of polycrystalline diamond and cubic boron nitride.

4. The indexable tool of claim 1, wherein the cutting elements are equally spaced apart at 90°, 120°, or 180° around the periphery of one of the major surfaces of the substrate.

5. The indexable tool of claim 1, wherein the cutting elements have rounded corners and edges.

6. The indexable tool of claim 1, wherein at least a portion of the nose of the cutting element is finished to reduce surface roughness.

7. The indexable tool of claim 1, wherein at least a portion of the cutting land of the cutting element is finished to reduce surface roughness.

8. The indexable tool of claim 1, wherein at least a portion of the cutting element comprises a chipbreaker.

9. The indexable tool of claim 1, wherein the cutting land and nose portion of the cutting element exhibit a rake angle.

10. The indexable tool of claim 1, wherein the tool body further comprises a means for attachment to a tool holder.

11. A superabrasive indexable tool for machining abrasion resistant materials, comprising:
    a. an indexable tool body consisting of a cemented metal carbide substrate comprising two major surfaces joined by a peripheral sidewall, and further comprising a plurality of equally spaced apart preformed pockets intersecting said sidewall, each pocket comprising a non-planar bottom surface comprising protrusions and depressions, and the bottom surface further having a downward slope of less than 48°, but greater than 2°, in relation to the major surface on which it is located, and sidewalls that slope outward from their junction with said bottom surface;
    b. a plurality of cutting elements defined by said pockets consisting of a superabrasive material bonded into said pockets during a high-pressure high-temperature sintering process; and
    c. the cutting elements comprising a nose portion with a cutting land, the nose portion forming a portion of the peripheral sidewall of the tool body.

12. The indexable tool of claim 11, wherein the pockets in the tool body have a generally triangular shape.

13. The indexable tool of claim 11, wherein the superabrasive material is selected from the group consisting of polycrystalline diamond and cubic boron nitride.

14. The indexable tool of claim 11, wherein the cutting elements are equally spaced apart at 90°, 120°, or 180° around the periphery of one of the major surfaces of the substrate.

15. The indexable tool of claim 11, wherein the cutting elements have rounded corners and edges.

16. The indexable tool of claim 11, wherein at least a portion of the nose of cutting element is finished to reduce surface roughness.

17. The indexable tool of claim 11, wherein at least a portion of the cutting land of cutting element is finished to reduce surface roughness.

18. The indexable too of claim 11, wherein at least portions of the cutting element comprise a chipbreaker.

19. The indexable tool of claim 11, wherein the cutting land and nose portion of the cutting element comprise a rake angle.

20. The indexable tool of claim 11, wherein the tool body further comprises a means for attachment to a tool holder.

\* \* \* \* \*